G. G. GRIFFIN.
CONFETTI MACHINE.
APPLICATION FILED NOV. 19, 1912.

1,082,804.

Patented Dec. 30, 1913.

3 SHEETS—SHEET 1.

WITNESSES
G. Robert Thomas
Wm. F. Nickel

INVENTOR
GERALD G. GRIFFIN
BY
ATTORNEYS

G. G. GRIFFIN.
CONFETTI MACHINE.
APPLICATION FILED NOV. 19, 1912.

1,082,804.

Patented Dec. 30, 1913.
3 SHEETS—SHEET 2.

WITNESSES
G. Robert Thomas
Wm. F. Nickel

INVENTOR
GERALD G. GRIFFIN,
BY Munn & Co.
ATTORNEYS

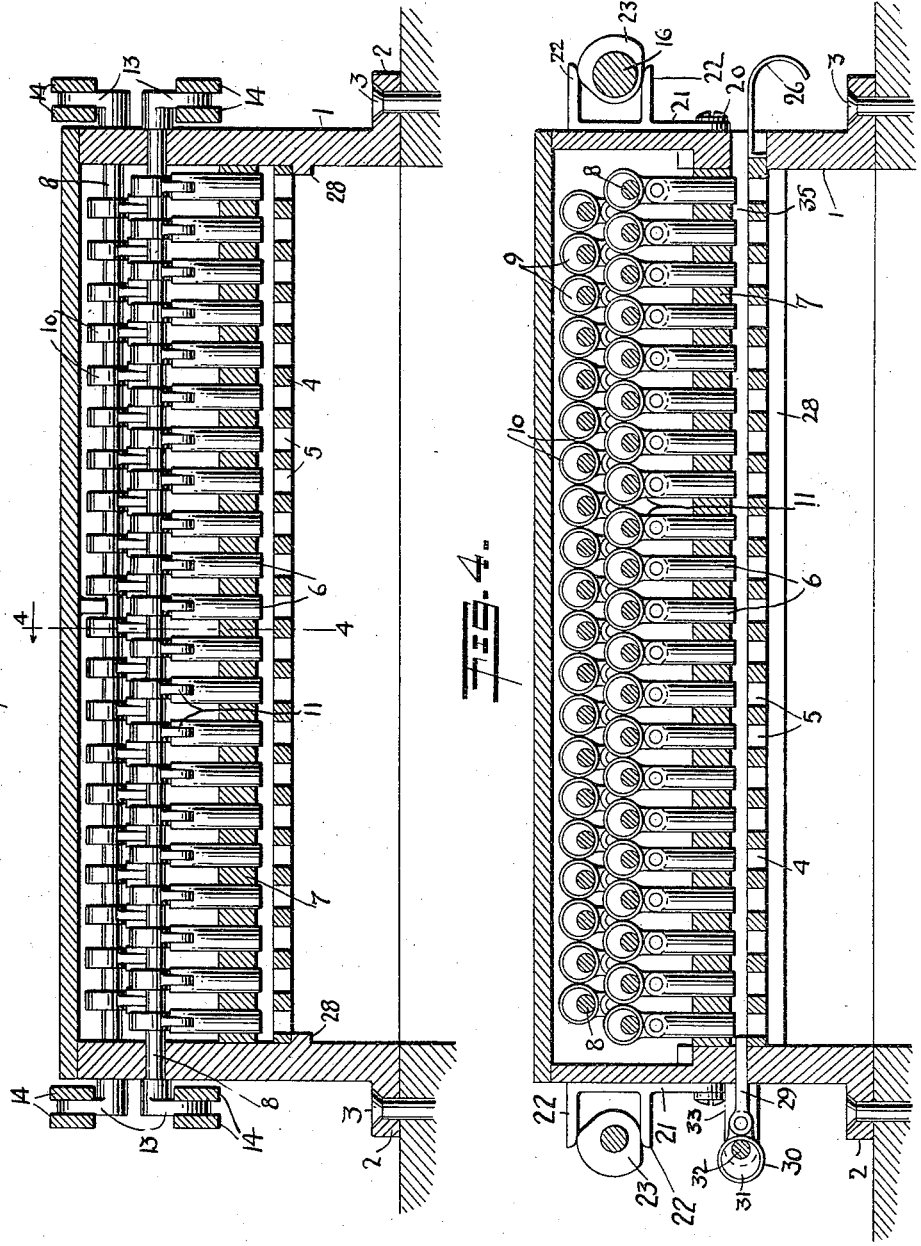

UNITED STATES PATENT OFFICE.

GERALD G. GRIFFIN, OF NEW YORK, N. Y.

CONFETTI-MACHINE.

1,082,804.

Specification of Letters Patent. Patented Dec. 30, 1913.

Application filed November 19, 1912. Serial No. 732,244.

*To all whom it may concern:*

Be it known that I, GERALD G. GRIFFIN, a citizen of the United States, and a resident of the city of New York, borough of Manhattan, in the county and State of New York, have invented a new and Improved Confetti-Machine, of which the following is a full, clear, and exact description.

My invention relates to an improvement in apparatus for making confetti, and the object thereof is to devise a simple and efficient mechanism by means of which a number of sheets of paper or cardboard can be divided into a number of small pieces of regular shape, with little or no waste of the material employed.

Reference is to be had to the accompanying drawings forming a part of this specification, in which the same characters of reference indicate the same parts in all the views.

Figure 1:
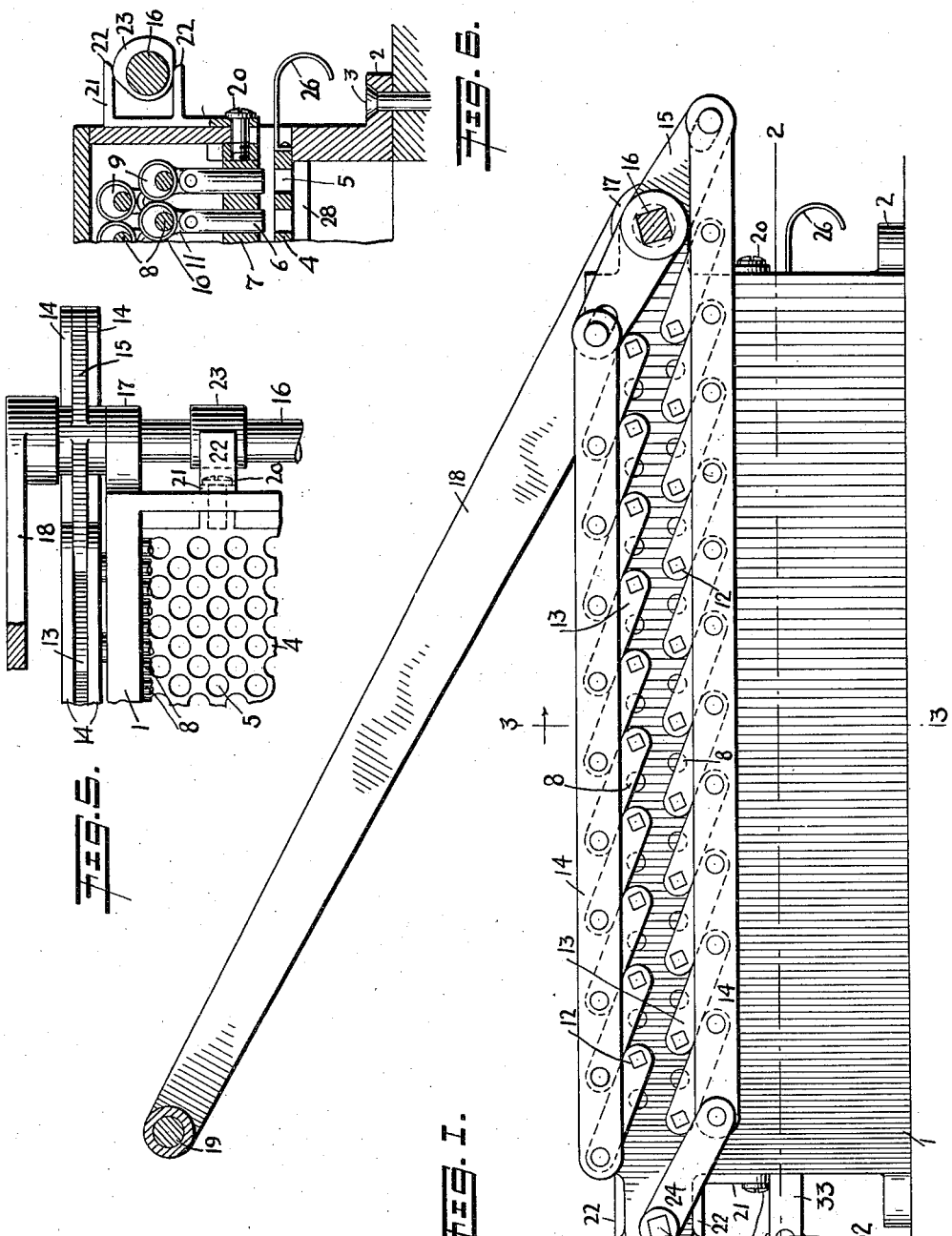
Figure 2:
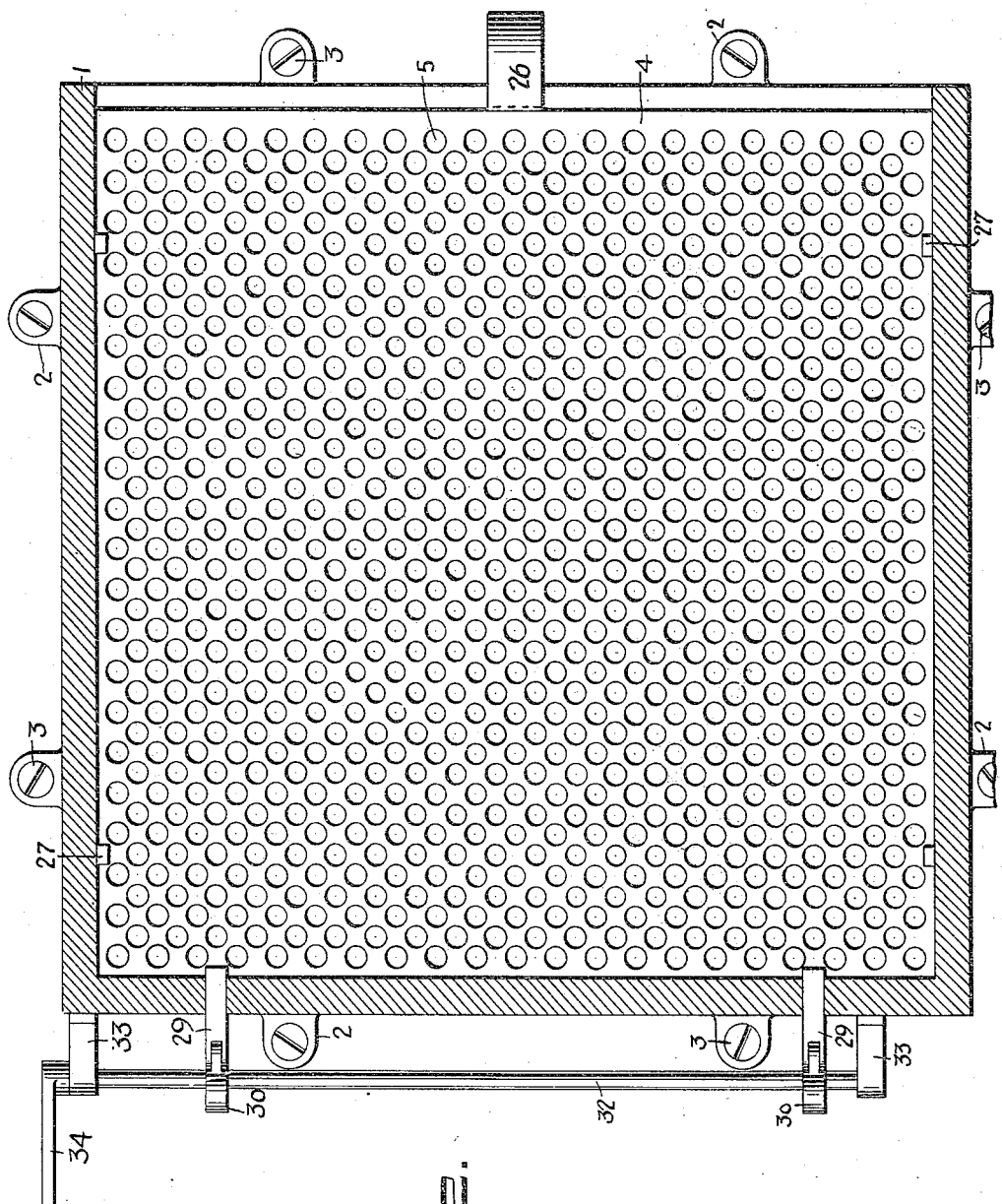

Figure 1 is a side elevation of my machine; Fig. 2 is a horizontal section on the line 2—2 of Fig. 1; Fig. 3 is a sectional view on the line 3—3 of Fig. 1, looking in the direction of the arrow; Fig. 4 is a sectional view on the line 4—4 of Fig. 3, looking in the direction of the arrow; Fig. 5 is a plan view of a detail, showing the manner in which the operating levers are connected; and Fig. 6 is a sectional view showing the parts illustrated at the right of Fig. 4, the plane of section being behind the plane on which Fig. 4 is taken.

My confetti machine comprises a framework 1 which can be provided with perforated lugs 2 to enable it to be secured by bolts 3 to a support, and this frame carries a plate 4 having a number of perforations 5 arranged in diagonally-extending intersecting rows. These openings give passage to plungers and guide them for reciprocations in fixed paths, which plungers pass through alined apertures in a movable plate 7, and in the operation of my machine the paper to be divided is placed upon the plate 4, the guiding plate 7 lowered to hold the paper in position, and the plungers operated to punch disks from the paper, and force these disks through the apertures 5, allowing them to drop into a suitable receptacle beneath the plate 4.

The stamping plungers 6 are operated by means of spindles 8, on which are mounted eccentrics 9. Each of these eccentrics is surrounded by a strap 10, and these straps have projecting arms 11, which are bolted to the upper ends of the plungers 6. When the spindles are turned, the eccentrics of course turn with them and move the spindles downward or upward.

The number of the spindles 8, their relation to one another, and also their manner of connection with the plungers 6 may be varied to a considerable extent without departing from the spirit of this invention, but for the sake of illustration from Fig. 1 it will be seen that these spindles are arranged in two rows or layers one above the other, the spindles of the upper layer being staggered with respect to the spindles of the lower, and on each side of the framework of the machine every other spindle has a squared end 12 which projects out beyond the side; thus beginning at the left, the first spindle in the upper row will have a squared end and project from the far side of the framework, while the second spindle on the upper row will have a squared end 12 which projects from the side which is near to the observer. In the lower row the first spindle will have a squared end which projects toward the observer, and the second spindle a squared end which projects from the side of the framework away from the observer. On each side of the machine the projecting squared ends of the spindles will be provided with operating arms 13 which are pivotally secured between upper and lower pairs of links 14, these upper and lower pairs of links being secured at their right ends to a master link 15, by means of a bolt and slot connection. This link 15 is mounted upon an operating shaft 16 resting in bearings 17 formed on the framework of the machine, and operated by means of levers 18 joined at their outer ends by means of a handle bar 19. It will be understood that the upper and lower pairs of links 14 extend along each of the sides of the machine, so that all of the spindles 8 will be connected to the operating shaft 16, to be actuated thereby. There will of course be two links 15, one for the links 14 at one side of the machine and the other for the links 14 on the opposite side.

The staggered arrangement of the spindles gives room for the plungers connected to the upper row to pass down between the spindles on the lower row, and by this arrangement I can employ and utilize the largest possible number of plungers 6 within a given space. It is obvious that the spindles may be placed in four or more rows, should it be desired to get a longer eccentric sweep of the spindles.

The guide plate 7, which has apertures in line with the apertures 5, has bolts 20 at its corners, projecting through the ends of the machine, and moving in slots formed in the framework 1. These bolts 20 are secured to arms 21 having spaced projections 22, between which rotates a cam 23, this cam being mounted on the operating shaft 16. There will be four of these cams, and four arms 21, two at one end and two at the other, and the two cams 23 at the left in Fig. 1, will be mounted upon a shaft similar to the shaft 16, and connected by links 24, which are pivoted by bolts to the lower pairs of links 14 on either side of the machine, so that when the levers 18 are operated, and the plungers depressed, the guide plates 7 will be depressed with them. The plate 4 is also provided with a handle 26, and guide lugs 27 along the sides. It moves upon guides or ribs 28 located below the plate and extending along the sides of the framework.

Passing through the rear of the framework 1 at the level of the top surface of the plate 4 are plungers or rods 29 pivotally secured to the straps 30, and eccentrics 31 mounted upon a spindle 32 carried in bearings 33, and operated by a lever 34. These plungers 29 move the sheets of paper laterally on the plate 4 a predetermined distance and keep them spaced a suitable distance from the rear wall of the framework 1.

In operation, the plate 4 may be withdrawn by means of the handle 26, and a suitable number of sheets of paper or cardboard laid on its surface, between the lugs 27. Preferably these sheets will be of such a size as to fit the plate, extending over the whole distance between the side lugs 27, and from the rear edge of the plate nearly up to the edge of the first row of apertures to the plate along the front edge. The plate is then pushed back until the inner edge strikes against the rear wall of the framework, the plungers or rods 29 being withdrawn by the lever 34 until they project no farther than the inner edge of the plate adjacent the first row of holes, as shown in Figs. 2 and 4. In this position the plungers 29 project inside of the framework 1 but slightly, and when the plate 4 is pushed in as far as it will go, the sheets of paper will engage the plungers when the plate comes to a stop. This is accomplished by arranging the sheets up to the inner edge of the plate 4 when the sheets are placed in position. The levers 18 are now drawn forward, moving down the guide plate 7 to press upon the sheets and clamp the same firmly upon the plate 4, and further movement of this lever now causes the plungers 6 to make their working stroke and punch pieces of paper in the form of disks through the holes 5 in the plate 4. These pieces of course will correspond in shape to the shape of the openings 5 and the cross-section of the plungers passing through the openings 5.

The shape of the cam 23 will be such that it will move the plate 7 downward before the plungers engage the sheets, and hold it down until the plungers have been withdrawn. It therefore serves as a stripper plate also. In this way the crumpling of the paper or cardboard is avoided. The perforated sheets are then pushed toward the front edge of the plate until the front edge of the sheets almost coincides with the front edge, and covers the front row of holes 5, that is, the front edges of the sheets are moved from a point or line indicated at 35 on Fig. 4, where they were located during the first operation, the required distance to the right of this point. This will bring the unperforated sections of the sheets in position to cover the holes 5, so that the sheet can be further divided.

The above operation of moving the sheets is effected by means of the plungers 29. Preferably the diameter of the holes and plungers will be about five-sixteenths of an inch, and the space between the holes 5 will not be greater than a quarter of an inch measured across or lengthwise of the sheets. The lever 18 is now operated as before, pulling the same to the right, causing the plate 7 to clamp the sheets against the plate, and the plungers 6 to stamp another quantity of sections from the material of which the sheets are composed. This completes the division of the sheet into a number of small particles, and practically none of the material is lost or wasted.

From the above description it will be seen that but two operations are necessary in order to make the confetti, and these are effected in quick succession after the sheets have once been put in place on the plate 4. It is only necessary to stop for an instant after the first working movement of the plunger 6 to manipulate the lever 34 to cause the perforated sheets to take the proper position for the next operation, and in this way large quantities of confetti can be made in a comparatively short time at a very small expenditure of labor or effort. Of course the machine can be operated by mechanical power if desired.

I wish to have it understood that the above description is illustrative only, and that I do not care to be limited to the exact details thereof, but wish to reserve to myself the right to make whatever changes in the shape, size and arrangement of the parts fairly fall within the scope and spirit of my invention.

Having thus described my invention, I claim as new and desire to secure by Letters Patent:

1. In an improvement of the kind described, the combination of a plurality of spindles arranged in horizontal layers, the spindles of each layer being staggered with respect to the spindle of the adjacent layer, a plurality of plungers to be operated by each of said spindles, arms projecting from the said spindles, links for connecting said arms, and means for imparting movement to said links.

2. In an improvement of the kind described, the combination of a plurality of spindles arranged in horizontal layers, the spindles of one layer being staggered with respect to the spindles of the adjacent layer, said spindles having ends projecting laterally in opposite directions, operating arms carried by said projecting ends, links connected to said operating arms, a shaft having links thereon connected to the first-named links, a lever for operating the shaft, and a plurality of plungers for each of said spindles, to be operated when the lever is moved.

3. In an improvement of the kind described, a perforated plate having lugs projecting from one face adjacent the lateral edges of the same, means to hold material on the plate adjacent said lugs, and means coöperating with said plate to punch the material when so held thereon.

4. In an improvement of the kind described, the combination of a framework, a supporting plate thereon, a plurality of plungers supported by the framework and extending into the same to pass across the upper edge of said plate adjacent the edge thereof, and means for simultaneously moving said plungers together to adjust them toward or from the adjacent edge of said plate.

5. In an improvement of the kind described, the combination of a guide plate, a slotted framework, means carried by the guide plate and engaging said slotted framework, projections carried by said last-named means, cams for engaging said projections to raise or lower the plate, a plurality of plungers passing through said guide plate, and means for connecting said plungers to the cams, whereby the plungers and guide plate can be moved together.

6. In an improvement of the kind described, the combination of a clamping plate, a framework having means for guiding said clamping plate, projections secured to said clamping plate and having lateral extensions, and cams engaging said lateral extensions to control said plate.

7. In an improvement of the kind described, the combination of a plurality of spindles arranged in two horizontal layers, the spindles of the two layers being staggered, said spindles having ends projecting alternately in opposite directions, arms connected to the extended ends of the spindles in the upper layer and extending upward, similar arms connected to the extended ends of the spindles of the lower layer and projecting downward, links joining the arms of the upper spindles and the arms of the lower spindles, a shaft having links, each of which is connected to one of the upper and lower links joining said arms together, a lever for operating said shaft, and a plurality of plungers connected to each of said spindles.

8. The combination of a support for carrying material to be worked, a plurality of plungers for engaging said material, one or more rods 29 arranged adjacent the edge on the upper face of the support to shift the position of said material after the first engagement thereof by the plungers in order to bring the unengaged portions into line with the plungers, to enable the working thereof to be completed, and means to operate said rods.

9. The combination of a perforated support for carrying material to be worked, a plurality of plungers in line with the perforations in the support to engage said material, one or more rods 29 arranged adjacent an edge of the said support at the top surface thereof to shift the position of the material after the first engagement thereof by the plungers, in order to bring the unengaged portions into line with the perforations and plungers and enable the working of the material to be completed, and means to operate said rods.

In testimony whereof I have signed my name to this specification in the presence of two subscribing witnesses.

GERALD G. GRIFFIN.

Witnesses:
WILLIAM F. NICKEL,
PHILIP D. ROLLHAUS.

Copies of this patent may be obtained for five cents each, by addressing the "Commissioner of Patents, Washington, D. C."